United States Patent [19]
Tohbaru

[11] Patent Number: 5,256,904
[45] Date of Patent: Oct. 26, 1993

[54] COLLISION DETERMINING CIRCUIT HAVING A STARTING SIGNAL GENERATING CIRCUIT

[75] Inventor: Shigeo Tohbaru, Wako, Japan

[73] Assignee: Honda Giken Kogyo Kabushiki Kaisha, Tokyo, Japan

[21] Appl. No.: 819,178

[22] Filed: Jan. 10, 1992

[30] Foreign Application Priority Data

Jan. 29, 1991 [JP] Japan .................................. 3-9004

[51] Int. Cl.⁵ .............................................. B60R 21/32
[52] U.S. Cl. .................................. 307/10.1; 340/436; 364/424.05
[58] Field of Search ............... 307/10.1, 9.1; 340/436, 340/669, 438; 364/424.05

[56] References Cited

U.S. PATENT DOCUMENTS

| | | | |
|---|---|---|---|
| 3,762,495 | 10/1973 | Usui et al. | 180/103 |
| 4,381,829 | 5/1983 | Montaron | 180/274 |
| 4,873,452 | 10/1989 | Morota et al. | 307/10.1 |
| 4,975,850 | 12/1990 | Diller | 364/424.05 |
| 4,985,835 | 1/1991 | Sterler et al. | 364/424.05 |
| 4,994,972 | 2/1991 | Diller | 364/424.05 |
| 5,021,678 | 6/1991 | Diller | 307/10.1 |
| 5,040,118 | 8/1991 | Diller | 364/424.05 |
| 5,067,745 | 11/1909 | Yoshikawa | 380/735 |

FOREIGN PATENT DOCUMENTS

4034975A1  5/1991  Fed. Rep. of Germany .

*Primary Examiner*—A. D. Pellinen
*Assistant Examiner*—Aditya Krishnan
*Attorney, Agent, or Firm*—Armstrong, Westerman, Hattori, McLeland & Naughton

[57] ABSTRACT

In a collision determining circuit designed to operate an air bag system or a belt retracting system based on an acceleration detected by an acceleration sensor in a vehicle, an acceleration signal output by an electric acceleration sensor is integrated in a passenger inertial speed calculation device to calculate a passenger inertial speed. At the same time, a power of the acceleration signal, filtered in a filter in a frequency range of 100 to 200 Hz, is calculated in a power calculation device. When at least one of the passenger inertial speed and the power exceeds a reference value, a starting signal generating circuit outputs a starting signal to ignite a squib for inflating the air bag system or for activating the belt retracting system. This ensures that even if the vehicle collides angularly against an obstacle, the starting signal can be properly produced without delay.

5 Claims, 2 Drawing Sheets

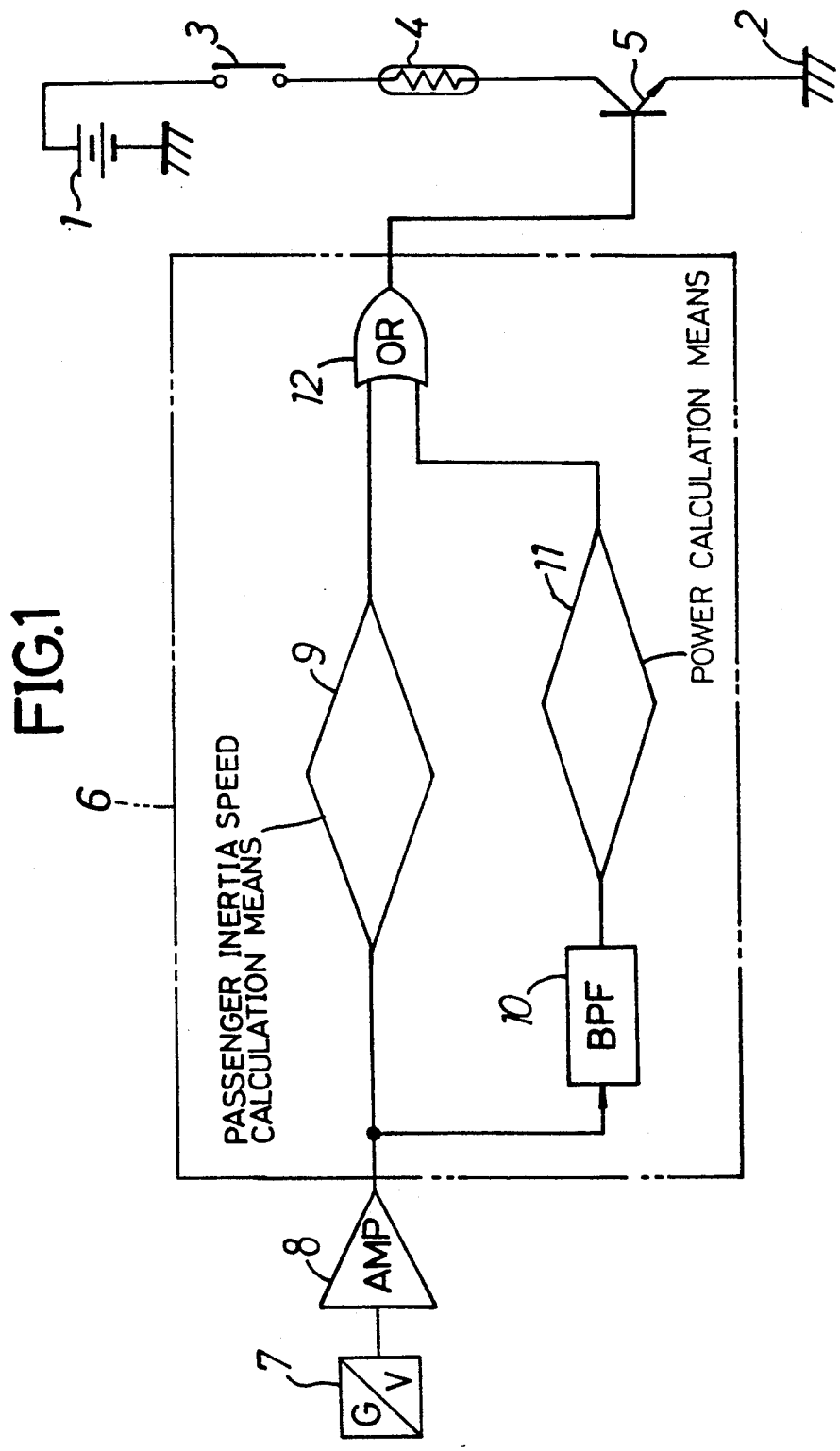

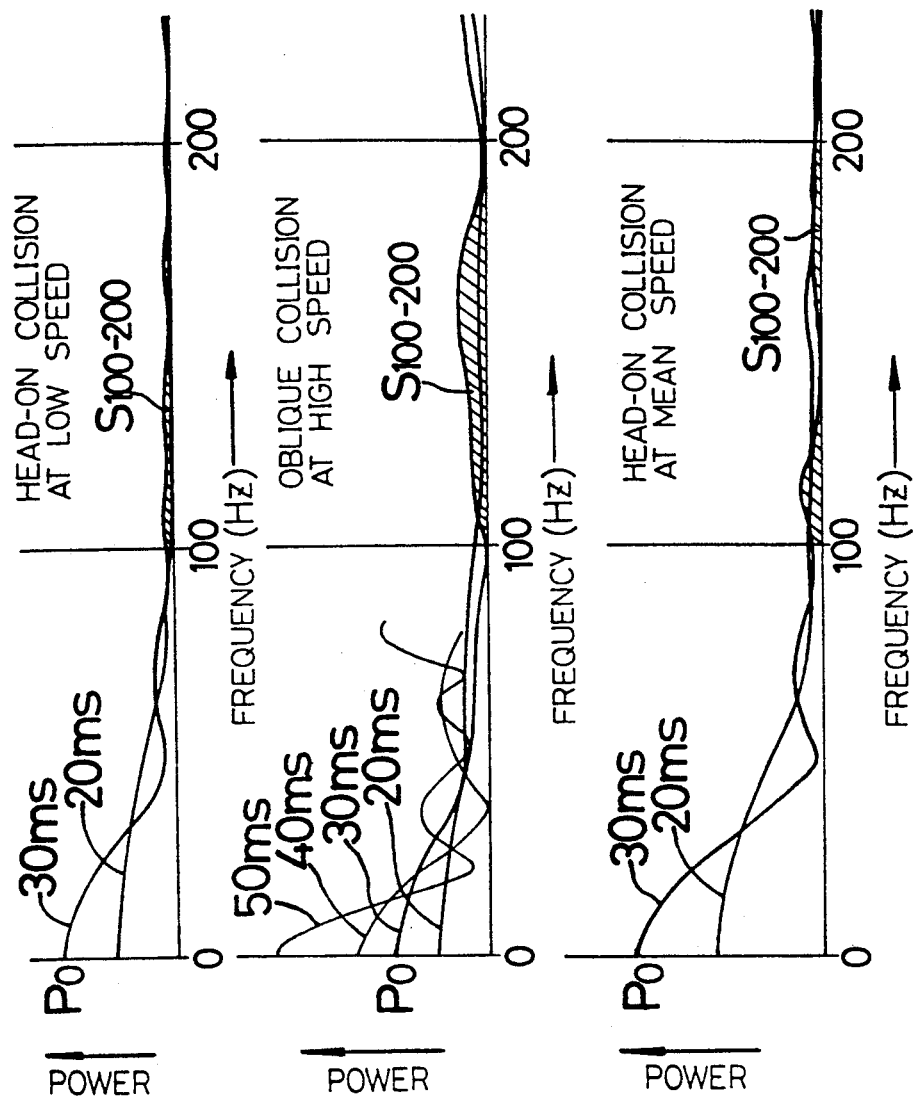

COLLISION DETERMINING CIRCUIT HAVING A STARTING SIGNAL GENERATING CIRCUIT

BACKGROUND OF THE INVENTION

1. Field of the Invention

The field of the present invention relates to collision determining circuits designed to produce a starting signal for operating an air bag system or a belt retracting system upon collision of a vehicle.

2. Description of the Prior Art

In an air bag system for protecting an occupant from collateral injury upon collision of a vehicle, if only an acceleration signal produced by an acceleration sensor is used as a starting signal of the air bag system, there is a possibility that the starting signal may be output when an area of a vehicle body housing the acceleration sensor collides against a small object which would cause almost no damage to a vehicle body. Therefore, a means for preventing such a situation is required. In addition, it is necessary to operate the air bag system, not only upon a collision providing a large shock but also upon a collision providing a shock which is small but continued for a long time. In such a case, however, there is a possibility that the acceleration sensor would not output the starting signal and hence, a means for covering this situation is also required.

To avoid such a problem, a technique has been proposed (see Japanese Patent Publication Kokoku No. 8574/84) in which a speed found by integration of an acceleration produced by the acceleration sensor, i.e., a passenger inertial speed of an occupant moved, for example, toward a steering wheel by inertia due to a collision is calculated, and when such a calculated passenger inertial speed exceeds a predetermined reference value, a starting signal for an air bag system is output.

However, it is experimentally know that such a technique is effective when a front portion of a vehicle collides vertically against an obstacle, but when the front portion of the vehicle collides obliquely against an obstacle, a passenger inertial speed is not sufficiently detected even if the speed at the time of the collision is relative large and thus, there is a possibility of the starting signal not being produced.

SUMMARY OF THE INVENTION

Accordingly, it is an object of the present invention to provide a collision determining circuit for an air bag system, or belt retracting system which is designed to always output a proper starting signal, even when a vehicle collides against an obstacle at various angles (i.e., oblique collision).

To achieve the above object, according to the present invention, there is provided a collision determining circuit designed to output a starting signal based on an output signal from an acceleration sensor which detects an acceleration generated due to the collision of a vehicle. The collision determining circuit comprises a passenger inertial speed calculation device for calculating a passenger inertial speed of an occupant by integration of the output signal from the acceleration sensor, a power calculation device for calculating a power of the output signal in a specific frequency range, and an OR circuit adapted to output the starting signal when at least one of the passenger inertial speed and the power in the particular frequency range exceeds a reference value.

With the above arrangement according to the present invention, the starting signal is produced when at least one of the passenger inertial speed provided by the integration of the acceleration generated due to the collision of the vehicle and the power of the acceleration in the particular frequency range exceeds a reference value. Therefore, upon a head-on collision of the vehicle, an air bag system or a belt retracting system can be operated based on an actual correlationship between the occupant and the vehicle. In addition, even upon an oblique collision (i.e., not head on) where a passenger inertial speed is difficult to detect a short time after the collision, the air bag system or the like can be operated without delay based on the power of the acceleration in the predetermined frequency range. Consequently, it is possible to always insure the proper operation of the air bag system or the like in conformity with the various types of collisions of the vehicle.

The above and other objects, features and advantages of the invention will become apparent from a consideration of the following description of the preferred embodiments, taken in conjunction with the accompanying drawings.

BRIEF DESCRIPTION OF THE DRAWINGS

The drawings illustrate a preferred embodiment of the present invention, wherein FIG. 1 is a block diagram illustrating the entire arrangement of a collision determining circuit; and FIGS. 2A to 2C are graphs illustrating power spectra upon a head-on collision at a low speed, upon an oblique collision at a high speed and upon a head-on collision at a mean speed, respectively.

DESCRIPTION OF THE PREFERRED EMBODIMENTS

The present invention will now be described by way of a preferred embodiment in connection with the accompanying drawings.

Referring to FIG. 1, a mechanical acceleration sensor 3, a squib 4 and a transistor 5 are disposed in series between a battery 1 and ground 2. The mechanical acceleration sensor 3 detects an acceleration generated due to the collision of a vehicle. A contact is closed to operate an air bag system, when the detected acceleration has exceeded a predetermined value. The squib 4 is adapted to be energized by the battery 1 to ignite a propellant for inflating an air bag, when the contact of the mechanical acceleration sensor 3 has been closed and a starting signal has been output to a base of the transistor 5 by a collision determining circuit 6 which will be described hereinafter.

Reference number 7 indicates an electric acceleration sensor which is adapted to convert, by a strain meter, an acceleration into an electric signal, i.e., a voltage signal and continuously output the same. The acceleration is generated due to the collision of the vehicle. An output signal from the electric acceleration sensor 7 is amplified by an amplifier 8 and then received into a passenger inertial speed calculation means 9 provided in the collision determining circuit 6.

The passenger inertial speed calculation means 9 is comprised of an integration circuit and functions to integrate the acceleration to calculate a passenger inertial speed $\Delta V$ after collision of the vehicle. The passenger inertial speed $\Delta V$ corresponds to a speed of an occupant, who is not using a seat belt, thrown in a forward direction of the vehicle by inertia upon collision of the vehicle. The value of such a speed depends upon a magnitude of the acceleration due to the collision and a time lapsed after the collision. The passenger inertial speed calculation means 9 outputs a signal to an OR circuit 12 which will be described hereinafter, when the calculated passenger inertial speed ΔV is larger than a predetermined reference value.

The signal output by the electric acceleration sensor 7 output through the amplifier 8 is also output through a band pass filter 10 of the collision determining circuit 6 where a frequency component having a frequency equal to or less than 100 Hz and a frequency component having a frequency equal to or more than 200 Hz are filtered off. Then, such an output signal is applied to a power calculation means 11 where the magnitude of a power of the acceleration in a frequency range of 100 to 200 Hz is calculated. The power calculation means 11 outputs a signal when the value outputted from the band pass filter 10 has an output value more than a reference value. The power calculation means 11 outputs the signal to the OR circuit 12 when the calculated power $S_{100-200}$ is larger than a predetermined reference value. The OR circuit 12 outputs an air bag system starting signal to the base of the transistor 5 when a signal is received thereinto from at least one of the passenger inertial speed calculation means 9 and the power calculation means 11.

FIGS. 2A to 2C each show a power spectrum of the acceleration generated due to the collision of the vehicle. FIG. 2A corresponds to the power spectrum upon a head-on collision of the vehicle is at a low speed (at a collision angle of 0°). FIG. 2B corresponds to the power spectrum upon an oblique collision of the vehicle at a high speed (at a collision angle of 30°). FIG. 2C corresponds to the power spectrum upon a head-on collision of the vehicle at a means speed (at a collision angle of 0°). In these graphs, the value at 0 Hz is a power of a direct current component of the acceleration from the moment of collision to a predetermined time point and corresponds to the passenger inertial speed ΔV. As apparent from comparison of FIG. 2A showing the power spectrum upon the head-on collision of the vehicle at the low speed with FIG. 2C showing the power spectrum upon the head-on collision of the vehicle at the mean speed, the magnitude of the power at 0 Hz is larger, as the collision speed is larger and the lapsed time is longer. Therefore, if a power $P_0$ of a direct current component, for example, after a lapse of 30 ms after the collision, is detected and the starting signal is output when the detected value exceeds a reference value, the operation of the air bag system upon the head-on collision can appropriately be controlled. In an actual case, since this power $P_0$ of the direct current component of the acceleration corresponds to the passenger inertial speed ΔV, the power $P_0$ is calculated as a passenger inertial speed ΔV in the passenger inertial speed calculation means 9.

In FIG. 2B showing the power spectrum based on the oblique collision at the high speed, the power $P_0$ of the direct current component after a lapse of 30 ms is smaller than the power $P_0$ in FIG. 2C despite the fact that the oblique collision is at higher speed than the head-on collision. It is conceived that this is because a vehicle body may be easily broken by the oblique collision at the high speed to produce only a low load. The power $P_0$ of the direct current component in FIG. 2C is increased with an increase in time lapsed after the collision, such as 40 or 50 ms. However, because the operation of the air bag system is required to be carried out promptly after the occurrence of the collision, it is desirable that the starting signal is output after at least 30 ms after the collision. Namely, it is not appropriate to use a value of 40 or 50 ms as described above. Therefore, when an oblique collision of the vehicle occurs, it is necessary to use another parameter substituted for the power $P_0$, i.e., the passenger inertial speed ΔV in order to output the starting signal. The magnitude $S_{100-200}$ of the power in the frequency range of 100 to 200 Hz at the lapse of 30 ms after the collision is used as this second parameter.

The magnitude $S_{100-200}$ of the power in the frequency range of 100 to 200 Hz is shown by oblique lines in each of FIGS. 2A to 2C. It will be understood that the magnitude $S_{100-200}$ in FIG. 2B showing the power spectrum based on the oblique collision at the high speed has a value larger than those in FIGS. 2A and 2C, each showing the power spectrum based on the head-on collision. It is conceived that this is because a high frequency component of the acceleration in an oblique collision is larger than that in a head-on collision.

The operation of the embodiment of the present invention having the above-described arrangement will be described below.

When an acceleration is generated due to the collision of the vehicle, the contact of the mechanical acceleration sensor 3, which has detected such an acceleration, is closed. At that time, if the collision determining circuit 6 has not output the starting signal, the transistor 5 is not energized and hence, the squib 4 is not operated.

The voltage signal which is output from the electric acceleration sensor 7 by the acceleration due to the collision is amplified in the amplifier 8 and applied to the passenger inertial speed calculation means 9 in the collision determining circuit 6. If the passenger inertial speed ΔV calculated in the calculation means 9 exceeds the reference value, i.e., if the speed of the occupant thrown forwardly by inertia due to the collision exceeds a predetermined speed, the signal is delivered to the OR circuit.

The voltage signal output by the electric acceleration sensor 7 is supplied through the amplifier 8 and the band pass filter 10 to the power calculation means 11. If the power $S_{100-200}$ calculated in the power calculation means 11 exceeds the reference value, the signal is delivered to the OR circuit.

As is apparent from reference to Table 1, for a head-on collision at a low speed (FIG. 2A), since neither of the counter-vehicle speed ΔV and the power $S_{100-200}$ reach the reference values, respectively, the OR circuit 12 would not output the starting signal. In the case of the oblique collision at a high speed (FIG. 2B), since the passenger inertial speed ΔV does not reach the reference value, but the power $S_{100-200}$ reaches the reference value, the OR circuit 12 produces the starting signal. For a head-on collision at a mean speed (FIG. 2C), since the power $S_{100-200}$ does not reach the reference value, but the passenger inertial speed ΔV reaches the reference value, the OR circuit 12 produces the starting signal. If the starting signal is output in this manner in an oblique collision at high speed or a head-on collision at a mean speed, the transistor 5 is energized to permit an electric current to flow across the squib 4, thereby causing the air bag system to be inflated to protect the occupant.

TABLE 1

| Type of Collision | ΔV | S$_{100-200}$ | Starting signal |
| --- | --- | --- | --- |
| Head-on Collision at a low speed | OFF | OFF | OFF |
| Oblique Collision at a high speed | OFF | ON | ON |
| Head-on Collision at a mean speed | ON | OFF | ON |

The air bag system can be operated properly within a short time by outputting the starting signal of the air bag system in consideration of a passenger inertial speed ΔV found by integration of the acceleration and a power S$_{100-200}$ of the acceleration in a predetermined frequency range, even if a head-on or oblique collision of the vehicle occurs.

Although the embodiment of the present invention has been described in detail, it will be understood that various minor modifications in design can be made without departing from the scope of the present invention as set forth in claims.

For example, the present invention is not limited to the air bag system and is also applicable to a belt retracting system for a seat belt.

What is claimed is:

1. A collision determining circuit for outputting a starting signal based on an output signal from an acceleration sensor which detects an acceleration generated due to a collision of a vehicle, said collision determining circuit comprising:
    a passenger inertial speed calculation means, operably coupled to said acceleration sensor, for calculating a passenger inertial speed of an occupant by integration of an output signal from said acceleration sensor;
    a power calculation means, operably coupled to said acceleration sensor, for calculating a power of said output signal of said acceleration sensor within a specific frequency range;
    a band pass filter means for filtering frequency components of said output signal of said acceleration sensor, prior to being inputted into said power calculation means, which are: (a) less than or equal to a first reference value, and (b) greater than or equal to a second reference value, said second reference value being greater than said first reference value; and
    a starting signal generating circuit means, operably coupled to said passenger inertial speed calculation means and said power calculation means, for outputting said starting signal when at least one of the following conditions is established: (a) said passenger inertial speed exceeds a reference value; and (b) said power within said specific frequency range exceeds another reference value.

2. A collision determining circuit according to claim 1 wherein said band pass filter means filters frequency components of said output signal a) less than or equal to 100 Hz and b) greater than or equal to 200 Hz.

3. A collision determining circuit according to claim 1 wherein said starting signal generating circuit is an OR circuit.

4. A collision determining circuit according to claim 1, wherein said starting signal generating circuit means is operably coupled to an air bag system.

5. A collision determining circuit according to claim 3 further comprising an electric switch means and a mechanical acceleration sensor which are disposed in series, an output of said OR circuit being connected to said electric switch means.

* * * * *